Oct. 11, 1966  E. EICKENBERG  3,277,572
HIDE-REMOVING APPARATUS
Filed March 17, 1964

Inventor:
EGON EICKENBERG

By Bricken and Goldfarb
ATTORNEYS

United States Patent Office 3,277,572
Patented Oct. 11, 1966

3,277,572
HIDE-REMOVING APPARATUS
Egon Eickenberg, Kleinenberger Strasse 27,
Solingen-Wald, Germany
Filed Mar. 17, 1964, Ser. No. 352,570
3 Claims. (Cl. 30—206)

This invention relates to a manually manipulated hide-removing apparatus for the stripping of animal skin from the flesh, and more particularly to a hand tool capable of being driven by a flexible shaft and provided with two counter-rotating toothed cutter disks mounted at the head of a housing, the rotary cutter disks being introduced between the skin and the flesh when the unit is in operation.

In the case of one type of design heretofore known, the cutter disks are mounted with spacing between them at the head of a two-part housing, and the drive is provided by a transmission gearing located within the unit housing, rotation being imparted to the gearing by means of a flexible shaft. This conventional type of stripping apparatus is associated with a number of disadvantages and drawbacks stemming from the arrangement and design of the gears within the housing. The gear drive in this conventional apparatus is composed of spur gears which are coaxially coupled with the cutter disks, of intermediate gears meshing with the spur gears and mounted overhung on shafts which are obliquely positioned with respect to each other, and positioned in proximity to the cutter disks with a spaced interval between the disks and the intermediate gears. A bevel gear which meshes with the two intermediate gears forms the head end of a shaft which runs in the longitudinal direction of the housing, the latter shaft being capable of being coupled with a flexible shaft.

Among the disadvantages and drawbacks stemming from the design and arrangement of the above-mentioned gear drive of the prior art apparatus is the fact that a large space is required for the accommodation of the gear drive, in the fact that the gears are susceptible to wear due to inadequate gear guidance and journalling, and in the fact that particles of blood, flesh and fat which adhere to the cutter disks generally have the opportunity to penetrate into the gear drive, contaminating and destroying the latter, particularly by the blood acid, and, at the least, having a drive-hindering effect on the gears and their bearings, to impede the operation.

It is therefore an object of the present invention to provide a gear drive arrangement and structure for a hide-removing apparatus of the type in question, so as to obviate the aforementioned disadvantages and drawbacks.

It is a further object of the invention to provide a skin-stripping apparatus which will be inexpensive to manufacture, durable and impervious to penetration by blood, flesh and fat, which will be compact in construction, have a minimum number of parts, light and conveniently handled by means of a grip extending from the housing, and not susceptible to rapid wear of the gears or bearings.

A still further object of this invention is to provide novel means for mounting the cutter blades of a skinning apparatus for counter-rotation with respect to each other which means not only support the cutter blades but also hold the two halves of the two-part housing in an assembled relationship, while also holding the bearing means for the gears which drive the cutter blades.

To these ends, and in accordance with one feature of the invention, the apparatus is provided with two counter-rotating toothed cutter disks mounted at the head of a two-part housing which is extended by means of a hand-grip. The cutter disks are rotatably mounted on a common shaft without any intervening space between them, and are arranged to be driven by means of a gear drive capable of being powered by a flexible shaft, or the like. The shaft which holds the cutter disks also serves to fasten the two housing halves together. The novel gear drive comprises spur gears coaxially joined with the cutter disks and rotatable on the cutter disk shaft, and two composite or double-toothed gears having inner straight teeth and outer bevel teeth, the straight teeth meshing with the last-named spur gears. The composite gears rotate on coaxial sutb shafts parallel to and spaced from the cutter disk shaft. A bevel gear meshing with the bevel teeth of both of the composite gears drives the latter two gears in mutually opposite directions. The bevel gear is mounted on one end of a shaft extending in the longitudinal direction of the housing and whose other end projects into the range of the manual grip of the unit. The inner straight teeth of the aforementioned composite gears are arranged on a smaller diameter than the outer bevel teeth.

According to another feature of the invention, the gears of the gear drive, or at least part of them, are made of synthetic plastic.

According to a further feature of the invention, for lateral guidance of the gears, thrust bearings are provided for the transverse shaft which carries the cutter blades and its spur gears, and also for the transverse stub shafts which carry the composite gears, these bearings preferably being in the form of ball or roller bearings which abut at one side against the body surface of the respective gear and at the other side against the housing wall or thrust plate therein. The thrust bearings are seated in annular recesses provided in the housing wall of the respective housing halves, or in an annular recess in the latter surface of the respective gear, in order to conserve space.

According to still another feature of the invention, a cover plate formed as a segment of a circle and having a U-shaped cross section is provided as a protective shield surrounding a portion of the two cutter disks and positioned between the disks and the gear drive.

These and other objects, features and many of the attendant advantages of this invention will be readily appreciated as the same becomes better understood by reference to the following detailed description when considered in connection with the accompanying drawings, wherein.

Figure 3:
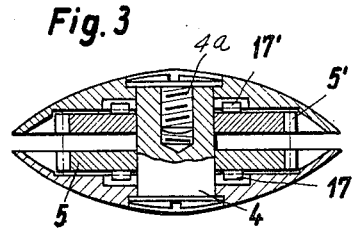
FIG. 3 is a section taken along the line A–B of FIG. 1.
Figure 4:
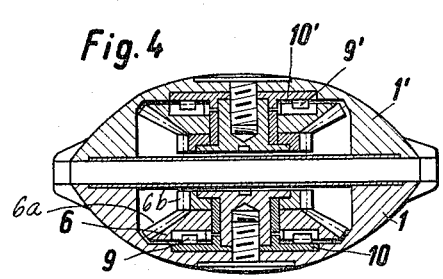
FIG. 4 is a section taken along the line C–D of FIG. 1.

In the drawings, the reference numerals 1 and 1' designate, respectively, the two halves of a hand-manipulative housing, made preferably of synthetic plastic material. The housing has an extension 2 at its lower end which forms a hand-grip or stock, threadedly connected to the housing halves 1, 1' by means of threads 2a. The housing halves 1, 1' each have an outwardly flared portion 101, 102 and define a casing in which the drive components and the cutter disks are mounted. The cutter disks 3, 3' are rotatably mounted at the head of the housing in a face-to-face relationship, without intervening spacing, on a transverse shaft 4. The shaft 4 is made in two parts, namely the main shaft portion, and a screwed-in end portion 4a (FIG. 3), thus forming at the same time a fastening means or screw-coupling for the two housing halves 1, 1'. Rotatably mounted on the main portion of shaft 4 and coaxial therewith are two spur gears 5, 5', each disposed against an outer surface of a cutter disk directed away from the other cutter blade. The spur gears 5, 5' are fastened to a respective cutter disk 3, 3' by means of rivets or screws 5a, 5b (FIG.

1). The drive gears 11, 6, 6', 5, 5' are preferably made of plastic material, which may be of the self-lubricating type. Such synethic plastic materials as nylon, Teflon or polystyrene may be used. Thus, the inner surfaces of the bores of the plastic gears can freely rotate on the outer surface of their respective shafts. Two thrust bearings 17, 17' are provided to rest within recesses in the respective housing halves 1, 1'. The bearings 17, 17' act axially along the main axis of shaft 4 and serve to laterally guide the spur gears 5, 5' and the cutter disks 3, 3'.

Beneath each of the spur gears 5, 5' is mounted a composite gear 6, 6', each having two sets of teeth, namely a set of bevel teeth 6a and a set of straight teeth 6b. Each of the composite gears 6, 6' is mounted in an overhung manner on an axle or separate stub shafts 7, 7' coaxially with respect to each other, the stub shafts 7 and 7' being retained in the respective housing halves 1 and 1' by means of screws 7a and 7b. The stub shafts 7, 7' are spaced from and parallel to shaft 4, and are each provided at their inner ends with an annular shoulder 8, 8' facing the cutter disks 3, 3'. The corresponding inner surfaces of the composite gears 6, 6' are each provided with a recess for accommodating the respective annular shoulder 8, 8' so that the inner ends of the shafts 7, 7', including the annular shoulders 8, 8' and which face toward the cutter disks 3, 3', lie flush with the corresponding inner surfaces of the composite gears 6, 6', a space remaining available between the gears 6, 6' for the passage of the cutter disks and for a shield 16, to be described later.

The composite-toothed gears 6, 6' are preferably made of a single integral piece of synthetic plastic, and each of these gears comprises an inner cylindrical set of straight gear teeth 6b having a smaller diameter, and an outer bevel gearing 6a having a larger diameter. The cylindrically arranged gear teeth 6b of the gears 6, 6' mesh with the teeth of respective spur gears 5, 5'.

Additional thrust bearings 9, 9' are provided for axially guiding the composite gears 6, 6', one side of the bearings 9, 9' resting within recesses provided in the outer lateral surfaces of the larger diameter portion of the gears 6, 6'. The outer sides of the thrust bearings 9, 9' rest against thrust collars 10, 10' which are retained in corresponding recesses within the respective housing halves 1, 1'.

A bevel gear wheel 11 is arranged within the housing cavity 104 and with an axis perpendicular to the axis of gears 6, 6' so as to mesh with the bevel gear teeth 6a of both of the gears 6, 6'. The bevel gear 11 is journalled in an overhung manner, being mounted on the upper end of a shaft 12, disposed coaxially with respect to the longitudinal axis of the housing 1, 1' and grip 2. The shaft 12 is journalled in two axially spaced ball bearings 13, 13, which in turn are retained in corresponding recesses provided in the housing halves 1, 1'. An outer spacer bushing 14 and an inner bushing 15 are provided around shaft 12 and between the two axially spaced ball bearings 13, 13 to secure the axial spacing between the two sets of bearings and their position within the housing. The lower free end of bevel gear shaft 12 is provided with a coupling portion 12' for attachment to a flexible drive shaft. A snap ring 18, which fits into a radial groove in shaft 12 and rests against the lower ball bearings 13, safeguards the shaft 12 and bevel gear 11 against axial displacement.

Upon rotation of the shaft 12 by means of a flexible shaft drive, rotary power is transmitted through the drive means comprising shaft 12, bevel gear 11, composite gears 6, 6', spur gears 5, 5' to rotate the cutter disks 3, 3' in mutually opposite directions.

Figure 1:
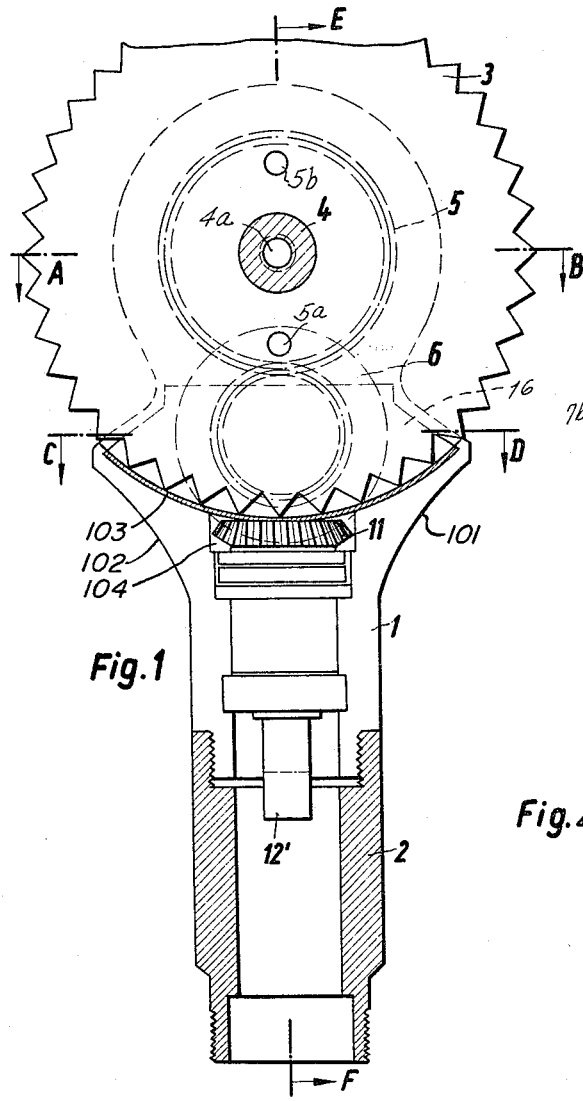
FIG. 1 is a sectional view in elevation taken along the vertical longitudinal axis of the skinning apparatus.
Figure 2:
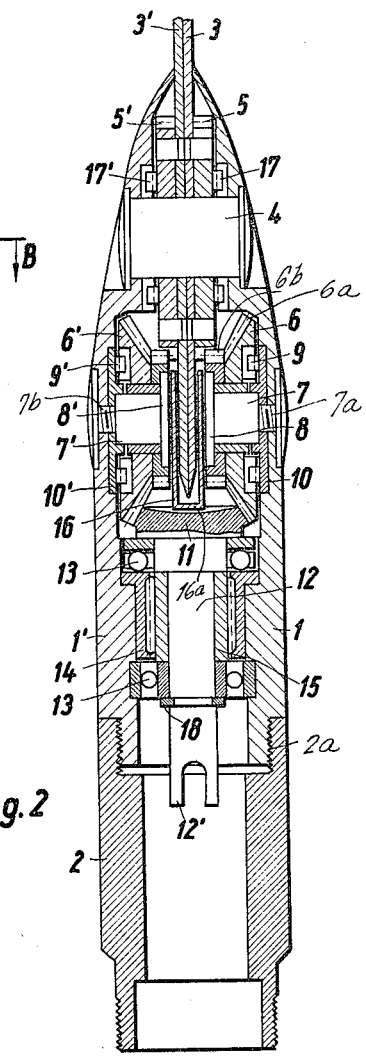
FIG. 2 is a section taken along line E–F of FIG. 1.

A shield or cover plate 16 is provided for the purpose of shielding the gear drive means against contamination of the main drive elements. The shield 16 is formed with a cross-sectional shape of a U (FIG. 2). The shield 16 is seated within the complementary lateral recesses in the housing casing, between the inwardly facing surfaces of the annular shoulders 8, 8' of the stub shafts 7, 7'. The vertical plate sides of the shield 16 are shaped as circular segments and encompass between them the portions of the two cutter disks 3, 3' in the area of the composite gears 6, 6', thus laterally shielding the composite gears from the adjoining cutter disks and from material adhering thereto, while the curved bridge portion 16a of the shield 16 is seated on the surface 103 of the housing halves 1, 1' and extends between the outer periphery of the cutter disks 3, 3' and the upper end of bevel gear 11.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention as set forth in the appended claims.

I claim:

1. A skin-removing apparatus comprising a housing having a longitudinal axis and two halves, said housing halves each having an outwardly flared portion, said halves being joined together in abutting relationship and having complementary recesses defining a casing having an extended concave surface and a central cavity opening into said concave surface, a pair of counter-rotating cutter disks, shaft means rotatably mounting said cutter disks in said housing with portions of said cutter disks extending outwardly of said housing, said shaft means securing said housing halves together, gear means rotatably mounted on said shaft means and fixed to said cutter disks, and drive means in said casing in toothed engagement with said gear means for rotating said cutter disks, said drive means including a pair of spaced coaxial stub shafts parallel to and spaced from said shaft means, a pair of counter-rotating composite gears each mounted on a respective one of said stub shafts, said composite gears each having bevel teeth and straight cylindrically arranged teeth coaxial with said bevel teeth, a drive shaft, means journalling said drive shaft along said longitudinal axis of said housing, and a bevel gear on said drive shaft and disposed within said cavity, said bevel gear meshing with the bevel teeth of said composite gears, said gear means meshing with said straight teeth of said composite gears, and a shield of U-shaped cross-section disposed between said pair of stub shafts and between said composite gears and having a bridge portion thereof seated on said concave surface, said shield receiving the portions of said cutter disks within said housing, said bridge portion of said shield being disposed between said cutter disks and said bevel gear and overlying said cavity.

2. A skin-removing apparatus according to claim 1, said composite gears each having a face adjacent the respective bevel teeth thereof, each of said faces having a recess therein, said bevel teeth of said composite gear being arranged on a larger diameter than said coaxial straight teeth thereof.

3. A skin-removing apparatus according to claim 2, said housing halves having annular recesses therein, thrust collars disposed within said recesses in said housing halves, and thrust bearings within said composite gear recesses and journalled against said thrust collars for providing balanced thrust guidance of said composite gears.

References Cited by the Examiner

UNITED STATES PATENTS

| | | | |
|---|---|---|---|
| 1,582,324 | 4/1926 | Whitcomb | 30—207 |
| 2,979,820 | 4/1961 | Thompson | 30—215 |
| 3,165,833 | 1/1965 | Logan | 30—206 |
| 3,176,397 | 4/1965 | Schuhmann | 30—219 |

WILLIAM FELDMAN, *Primary Examiner.*

J. C. PETERS, *Assistant Examiner.*